Dec. 3, 1963  R. S. CODRINGTON  3,113,087
METHODS AND APPARATUS FOR THE INVESTIGATION
OF MATERIALS BY RADIATION
Filed July 24, 1957  2 Sheets-Sheet 1

INVENTOR
ROBERT S. CODRINGTON
BY
Brumbaugh, Free, Graves
& Donohue
HIS ATTORNEYS Dec. 3, 1963  R. S. CODRINGTON  3,113,087
METHODS AND APPARATUS FOR THE INVESTIGATION
OF MATERIALS BY RADIATION
Filed July 24, 1957  2 Sheets-Sheet 2
FIG.7.
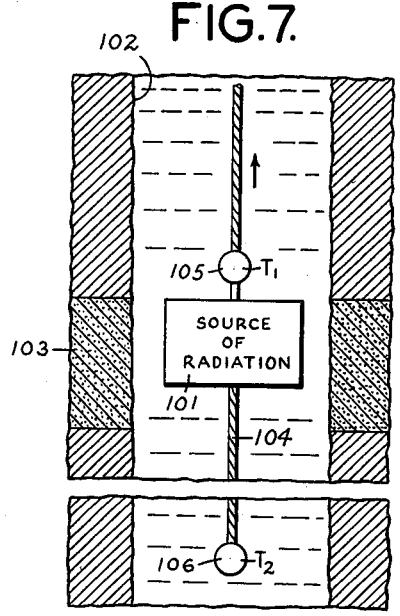
FIG.8.
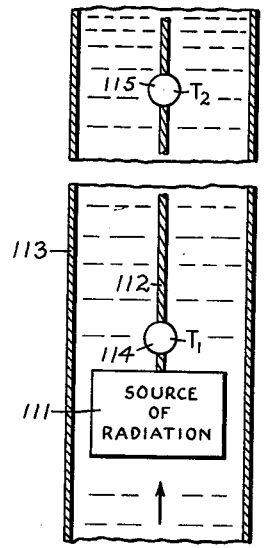
FIG.9.
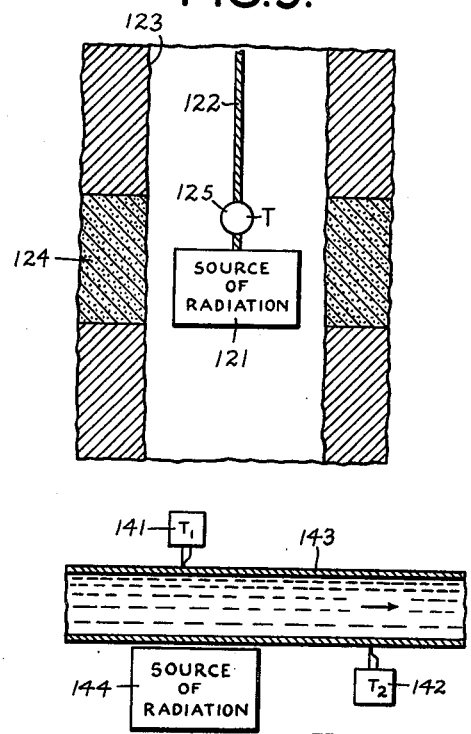
FIG.10.
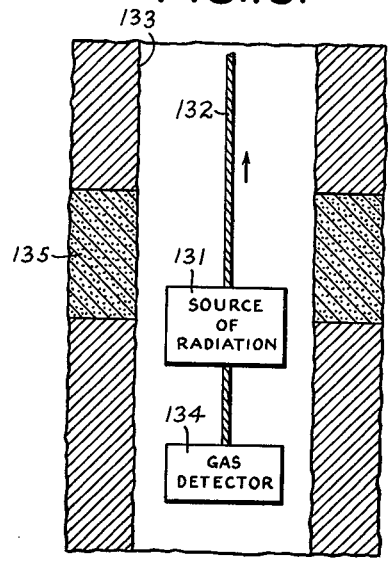
FIG.11.
INVENTOR
ROBERT S. CODRINGTON
BY
Brumbaugh, Free, Graves & Donohue
HIS ATTORNEYS

United States Patent Office 3,113,087
Patented Dec. 3, 1963

3,113,087
METHODS AND APPARATUS FOR THE INVESTIGATION OF MATERIALS BY RADIATION
Robert S. Codrington, Ridgefield, Conn., assignor to Schlumberger Well Surveying Corporation, Houston, Tex., a corporation of Texas
Filed July 24, 1957, Ser. No. 673,845
5 Claims. (Cl. 204—193)

The present invention relates to the testing and analysis of materials by radiation, and, more particularly, to novel methods and apparatus for investigating the chemical properties of an unknown substance disposed in an inaccessible location by radiation.

The art and science of the testing and analysis of materials to determine the constituents of the material and the properties of the particular constituents has become increasingly well developed. However, in most known types of analytical testing methods, the substance, whose properties and constituents it is desired to determine, is normally readily available for chemical and physical analysis in the laboratory. While the analytical methods utilized in the laboratory have proven highly successful, there is an ever increasing need for testing methods which will prove satisfactory in the field where the unknown substance being tested is disposed in an inaccessible location.

For example, in the petroleum industry, it is necessary to be able to determine the presence of a particular organic constituent which may or may not occur in a particular earth formation surrounding a bore hole many thousands of feet from the surface of the earth. At other times, it is desirable to know whether the fluid being pumped through the production tubing at some remote level in the bore hole contains a particular constituent. Similarly, in refining plants and pipe lines, it is desirable to know the nature of a substance flowing through various conduits and piping, without interfering with the flow of the substance through the conduits or piping and without the necessity of tapping the conduits in order to analyze samples of the substance.

In accordance with the principles of the invention, there is provided a method of investigating the chemical properties of an unknown substance in an inaccessible location involving the steps of exposing the unknown substance while disposed in said inaccessible location to irradiation by a source of radiation for at least an interval of time sufficient to induce a chemical change in the unknown substance. The result of that chemical change is then detected in the vicinity of the inaccessible irradiated substance. The detected result is indicative of or useful in determining the presence of a particular constituent in the unknown substance.

In accordance with well known principles of radiation chemistry the irradiation of certain organic compounds, for example, by sources of radiation such as gamma rays induces or initiates polymerization. In the laboratory, this polymerization may be detected by a great variety of methods and techniques, such as weighing the substance before and after irradiation or noticing a change from a liquid to a gaseous or solid phase, to mention only a couple of well known techniques. However, each of these techniques requires that the substance being analyzed be available for visual and physical inspection. It has been found that when polymerization takes place in certain organic substances, the reaction is exothermic, and the thermal energy is given off in detectable quantities. This thermal energy may be detected by a variety of suitable conventional thermometric devices.

In one exemplary embodiment of the invention, a source of radiation is placed in or adjacent a substantially closed conduit or a bore hole. The intensity of the source, which may, for example, be any suitable source of gamma rays, is preferably of a known predetermined magnitude sufficient to induce polymerization in the particular constituent that is desired to be detected. A change in temperature may then be detected, indicating the presence of the particular constituent. When there is relative movement between the source of radiation and the irradiated substance, it is desirable to position a thermometric device adjacent and in fixed relation to the source of radiation and a second thermometric device at a point spaced from the source of radiation by a distance sufficient to permit a detectable and substantial increase in temperature in and adjacent the irradiated substance by the time the second thermometric device is positioned adjacent the irradiated substance. The difference in temperature between the two thermometric devices when each was positioned adjacent the irradiated substance is indicative of whether or not polymerization of a particular constituent occurred in the irradiated substance, thereby indicating the presence or absence of the particular chemical constituent. In some cases, such as when a particular location in a bore hole appears suspicious, the source of radiation and a thermometric sensing device may be lowered to that particular location to irradiate the earth formations adjacent thereto and may be maintained at that position for a time interval sufficient to indicate whether or not polymerization occurred.

It has been found that when polymerization takes place in certain organic substances, such as certain constituents of oil, hydrogen gas is evolved. Therefore, in an alternate embodiment of the invention, the material under investigation may be irradiated by an appropriate source of radiation to induce or initiate polymerization therein and the hydrogen gas evolved is detected by the use of conventional hydrogen detecting means, such as a palladium tube detector.

In accordance with another aspect of the invention, the source of radiation may be used to irradiate the unknown substance under investigation to produce paramagnetic free radicals of a particular constituent of the unknown substance. These free radicals have unpaired valence electrons which are believed to be formed due to the breaking of valence bonds in a hydrocarbon, for example, when the free radical is formed. They are usually highly reactive and, if given the opportunity, they will recombine readily. The recombination rate is usually much faster in liquids than in solids and is usually faster in either phase at higher temperatures. In crystalline solids, the radiation in addition to producing free radicals, may displace ions from lattice points and create F or V centers which are also paramagnetic.

If, in accordance with another exemplary embodiment of the invention, a heterogeneous formation is irradiated with a strong source of radiation, such as a source of gamma rays, a number of different paramagnetic centers may be produced in substances, such as oil, water, clay, and sand crystals. If the source of radiation is removed a signal representative of the presence of the free radicals will decay. In many cases this is an exponential decay, so that a time constant $\tau$, called the life-time, may be defined for the process. In cases in which the decay is non-exponential, the life-time may be taken as the time period for the signal amplitude to decrease to one-third its original value.

If the life-time of free radials in a particular phase is known, the characteristic decay of the signal from this phase after removal of the irradiation source may be used to identify the phase in the presence of other phases showing paramagnetic centers.

For example, in a specific earth formation in a bore hole, there might be water with $\tau$ equal approximately to $10^{-5}$ seconds, oil with $\tau$ of approximately 10 seconds, clay with $\tau$ of approximately one hour, and quartz particles with $\tau$ of approximately a few days. If a radiation solid angle of $\pi/2$ steradians is assumed, a valence bond energy in the oil of 10 electron volts and a gamma-ray energy of 10 mev. with perhaps a 1% efficiency, the number of gamma-rays inducing useful free radicals is 1/800 the number emitted by the source. If $10^{16}$ free radicals are required for drill hole detection, the strength of the radiation source that is required will be on the order of 100 curies, with one curie equivalent to $3.7 \times 10^{10}$ distintegrations per second. While such a source is relatively large, if an accelerator is used, there will be no radiation hazard. On the other hand, if the conventional small size gamma-ray sources are used, an extremely heavy surface shield would generally be required.

In the case of the detection of free radicals in oil, it is necessary to distinguish the life-time of the oil free radicals from other radical life-times. Therefore, in accordance with the invention, the intensity of the source of radiation must be closen just large enough to give a good signal representative of the oil free radicals and should be modulated (i.e., turned on and off, or alternately exposed to and shielded from the substance under investigation) at a rate determined by the life-time of the oil free radicals. The optimum source intensity should not be of such a magnitude as to create sufficient free radicals in water to give a detectable signal, and the modulation of the signal representative of the oil free radicals should be such as to enable signals representative of the oil free radicals to be distinguished from the signals resulting from F and V centers, and from long-lived free radicals. The modulation of the intensity of the radiation source may be accomplished by manually or automatically turning the source on and off, as in the case of an accelerator or by mechanically moving a constant source in and out of a shield.

The presence of the free radicals formed in the unknown substance under investigation may be determined through the use of any suitable detecting means employing magnetic resonance phenomena. It is necessary in detecting the presence of the free radicals, to at least attempt to detect the presence of the free radicals at a time subsequent to the interval of time during which the source of radiation is effectively irradiating the particular unknown substance under investigation, and at a time when the free radicals would be expected to be detectable in the substance under investigation.

In some embodiments of the invention, such as would be utilized during the investigation of materials in a bore hole traversing unknown earth formations, the source of radiation would be lowered into the bore hole along with two or more free radical detecting means spaced apart longitudinally in the bore hole, in a fixed relation dependent upon the speed at which the source and the detecting means are to be moved through the bore hole. In other embodiments of the invention, such as would be utilized for investigating the nature of unknown substances flowing through production tubing in a bore hole, or through otherwise located closed conduits, the source of radiation and two or more means for detecting the presence of free radicals may be fixedly spaced at intervals along the conduit or production tubing and may be located either within the conduit or outside the conduit but adjacent thereto.

These and other novel features and advantages of the present invention will become more apparent by reference to the following detailed description taken in conjunction with the accompanying figures of the drawing, in which.

Figure 6:
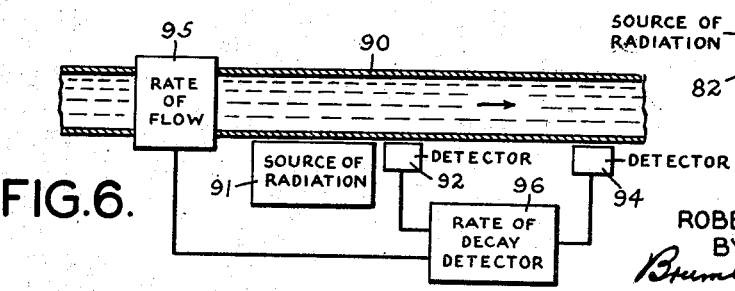

FIG. 6 is a schematic representation of another exemplary embodiment of the invention in which means utilizing magnetic resonance phenomena is employed to investigate the chemical properties of an unknown substance flowing through a horizontal closed conduit; and FIGS. 7, 8, 9, 10 and 11 are schematic representations of additional alternate embodiments of the invention in which the investigation of the chemical properties of unknown substances in inaccessible locations such as bore holes, production tubing and other closed conduits is accomplished by detecting variations in temperature or the production of gaseous products by chemical changes in the unknown substance as a result of the irradiation of the unknown substances by a source of radiation, in accordance with the invention.

Figure 1:
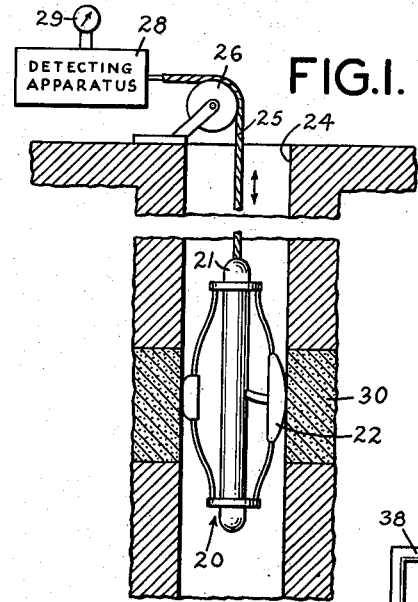
FIGURE 1 is a schematic diagram of an exemplary embodiment of the present invention for investigating the properties of an unknown substance disposed either in a bore hole or in adjacent earth formations traversed by the bore hole.

Referring now to FIG. 1, logging equipment 20, which may take any conventional form, but which preferably includes a housing 21 and at least one wall engaging member or pad 22, is adapted to be lowered into a bore hole 24 by means of a conventional electrical conductor cable 25 controlled by suitable hoist and winch equipment 26. The electrical conductor cable 25 may be connected in a conventional manner to detecting apparatus 28 and indicating means 29, which may take any suitable form depending upon the logging or exploration technique that is desired to be used. The particular apparatus for accomplishing the investigation of the chemical properties of fluids or other materials which may be located within the bore hole 24, or which may form constituent parts of the earth formations 30 which are traversed by the bore hole 24 may be used in conjunction with other well known types of logging apparatus for determining the characteristics of the bore hole and its environs.

In accordance with the principles of the present invention, many forms of the investigatory apparatus, such as disclosed in the various exemplary embodiments of the instant application, may be supported by or form a part of the housing 21 or the wall engaging member 22.

Figure 2:
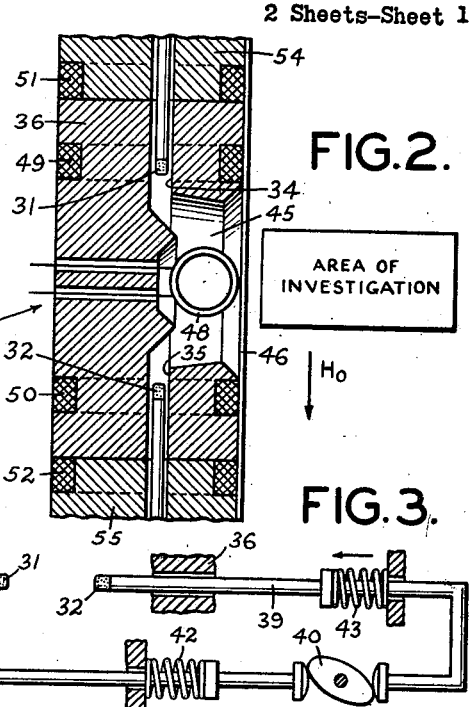
FIG. 2 is a partial view in vertical section of the wall engaging pad of FIG. 1 depicting an exemplary arrangement of a source of radiation and detecting means utilizing magnetic resonance phenomena, in accordance with the principles of the invention.

In the sectional view in FIG. 2 of the wall engaging member 22, two sources of radiation 31 and 32, for example, conventional sources of X-rays, gamma-rays, optical radiation or other suitable forms of radiation, are cooperatively and movably disposed in channels 34 and 35, respectively, in the main portion or body 36 of the wall engaging member 22, which is preferably composed of lead so as to effectively shield the sources of radiation 31 and 32 from the area under investigation.

Figure 3:
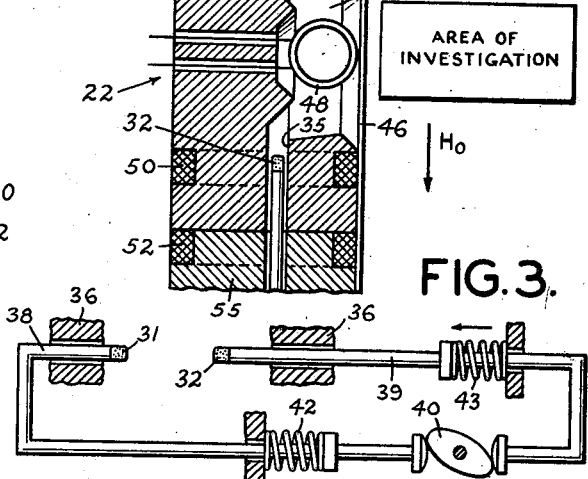
FIG. 3 is an exemplary view of mechanism for controlling movement or modulation of the radiation sources of FIG. 2, in accordance with the invention.
Figure 4:
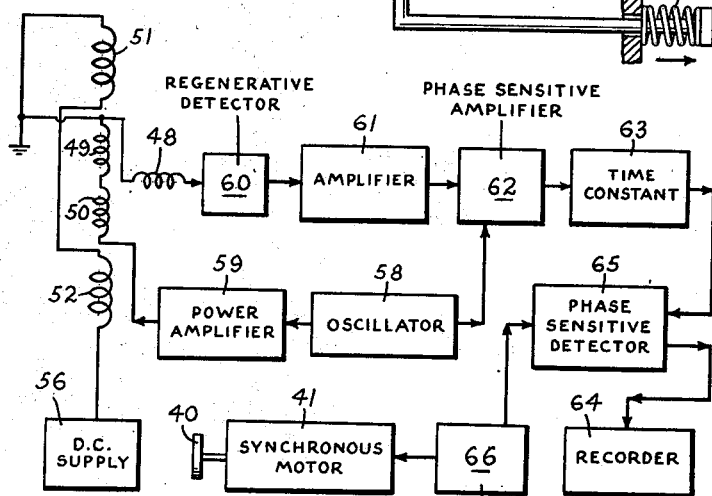
FIG. 4 is a schematic diagram of an exemplary form of detection circuit means utilizing magnetic resonance phenomena for use in conjunction with the apparatus of FIGS. 2 and 3, in accordance with the principles of the invention.

As shown in FIG. 3, the sources 31 and 32 are positioned on the ends of rods 38 and 39, respectively, whose position is controlled by a cam 40 driven by a synchronous motor 41 (FIG. 4). Compression springs 42 and 43 respectively act to urge the rods 38 and 39 against the surfaces of the cam 40, thus providing a positive control by the cam 40 upon the relative positions of the sources 31 and 32.

Positioned in a space 45 opening to the area under investigation, but separated therefrom by means of a thin window 46, which may be composed of mica or glass, for example, is a coil 48. The axis of the coil 48 is positioned normal to the longitudinal axis of the wall engaging member 22 and in a plane substantially parallel to the plane of the window 46. Above and below the coil 48 two coils are mounted in the lead body 36 of the wall engaging member with their axes lying perpendicular to the axis of the coil 48 but in line with the axis of the wall engaging member. As shown in FIG. 4, the coils 49 and 50 are interconnected in series relation.

Two additional coils 51 and 52 are disposed outwardly of the coils 49 and 50 with respect to the coil 48 and are spaced apart therefrom but with their axes aligned with the axes of the coils 49 and 50. Also, as shown in FIG. 4, the coils 51 and 52 are interconnected in series relation. Steel end pieces 54 and 55 are disposed within the coils 51 and 52 to assist in the production of the desired magnetic field which is to be created by means of these coils.

Paramagnetic free radicals having unpaired valence electrons are produced in constituents of the unknown substances in the area under investigation when the radiation sources 31 and 32 are moved into the space 45 to irradiate the area under investigation. As mentioned earlier in the application, in the case of the investigation of materials in a bore hole, the required source strength should be on the order of 100 curies. In the instant example, that source strength is provided jointly by sources 31 and 32, which each may have a strength of 50 curies.

From an inspection of FIG. 3, it will be seen that the elliptical shape of cam 40 will cause the sources 31 and 32 to move toward each other on the major axis of the ellipse and that the sources will move away from each other, or be withdrawn into the channels 34 and 35 on the minor axis of the cam ellipse. Thus during each revolution of the cam 40, the sources 31 and 32 will extend into the space 45 so as to irradiate the area of investigation, will be withdrawn from the space 45 so as to be shielded from the area of investigation by the lead body 36 of the wall engaging member 22, will be reentered into the space 45 and then withdrawn. Accordingly, it will be evident that the time period in which the area under investigation is irradiated by the sources 31 and 32 and the period within which the area of investigation is shielded from the sources 31 and 32 are a function of the configuration of the cam 40 and its speed of revolution.

As a result of the irradiation of the area of investigation, paramagnetic free radicals will be produced in certain substances, if they are present within the area of investigation. These paramagnetic free radicals may be detected, in accordance with one exemplary embodiment of the invention, by the utilization of magnetic resonance phenomena and the attempt to detect the presence of the free radicals is made at least during the time interval in which the area under investigation is shielded from the sources 31 and 32.

In order to detect the presence of the paramagnetic free radicals by employing magnetic resonance phenomena, a detection circuit such as that shown in FIG. 4 may be utilized, in which a unidirectional steady state source of electrical energy, D.C. supply 56, is connected to the coils 51 and 52 and when energized produces a static magnetic field within the area of investigation. This static magnetic field because of the disposition of the coils 51 and 52 has an axis disposed longitudinally with respect to the wall engaging member 22. In one preferred embodiment of the invention, the static magnetic field should have an intensity $H_0$ of 10 gauss lying in the direction of the arrow in FIG. 2.

A high frequency alternating magnetic field, for example at a frequency of 28 mc., transverse to the static magnetic field is produced by the energization of the coil 48 by means of a suitable regenerative oscillating detector 60. In some cases, it may be desirable to have the physical axis of the coil 48 lying in a somewhat different plane with respect to the remaining coils 49, 50, 51 and 52. In that case, a satisfactory response may be achieved, as long as a substantial component of the high frequency alternating field lies in a direction normal to steady state magnetic field.

As a result of interaction of these fields and the unpaired valence electrons of paramagnetic free radicals in the area of investigation, magnetic resonance phenomena take place involving the unpaired valence electrons. These magnetic resonance phenomena cause variations to occur in the energy absorbed from the high frequency alternating field, thereby producing a detectable signal in the coil 48 which is detected by the detector 60, which may be a regenerative oscillating detector of any conventional type suitable for detecting the modulation envelope of the voltage across coil 48.

The output of an oscillator 58 is connected through a conventional power amplifier 59 to the coils 49 and 50, whose axes lie in substantially the same path as the axes of the coils 51 and 52, to produce an alternating field superimposed on the static field, so as to produce a modulation of the static field, for example of ±1 gauss, at a frequency determined by the oscillator 58, which may be operated at a frequency of 220 c.p.s. The power amplifier 59 is adjusted to provide sufficient amplification of the signal from the oscillator 58 to obtain a substantial modulation effect. A corresponding modulation occurs in the signal produced in the coil 48, which is detected by the regenerative oscillating detector 60.

The modulated signal representative of the energy absorbed from the high frequency alternating current field after detection by the regenerative detector 60 is fed through an amplifier 61 to a phase sensitive detector 62, which is also coupled to the oscillator 58 for a referencing voltage. A phase sensitive detector suitable for this purpose is described in detail in pages 111–114 of the textbook "Theory of Servo-Mechanisms," by James, Nichols, Phillips (vol. 25, Radiation Laboratory series, first edition, 1947, published by McGraw-Hill Book Company, New York). Where the signal-to-noise ratio is likely to be small the improved phase sensitive detector described in pages 254–255 of "Review of Scientific Instruments," by N. A. Schuster, vol. 22, April 1951, may advantageously be employed.

A D.C. signal proportional to the number of paramagnetic free radicals or paramagnetic centers produced in the area under investigation is then fed through a selective control circuit 63, which may take any suitable form whereby signals of a time period or duration less than a predetermined amount such as one second would be heavily attenuated, to conventional recording equipment 64, which preferably may be selective as to the signal frequency in that it has a time constant of one minute.

In order that a signal recorded by the recording equipment 64 shall be representative of the quantity of the particular constituent present in the area of investigation a second phase sensitive detector 65 is interposed between the circuit 63 and the recording equipment 64. The phase sensitive detector 65 is controlled by a reference voltage from a conventional power oscillator and frequency doubler 66, the fundamental frequency of which controls the synchronous motor 41.

If it is desired, for example, to detect the presence of oil in the area of investigation, the oscillator 58 may be designed to produce a square wave signal at a frequency of 220 cycles per second. A 220 c.p.s. modulated signal is then fed from the coil 48 to the regenerative detector 60. Also, in the detection of oil in the area of investigation, the speed of the synchronous motor 41 should be on the order of 3 r.p.m. Accordingly, the electrical power supplied to the synchronous motor 41 should be at a frequency of 0.05 c.p.s. Further, the reference voltage for the phase sensitive detector 65 supplied by the power oscillator frequency doubler 66 should be at a frequency of 0.1 c.p.s., and the time constant of the recording equipment 64 should be on the order of one minute.

The modulation rate, i.e., the rate at which the sources 31 and 32 are moved in and out of the shield, will depend to some extent upon the temperature and on the type of oil to be detected. Accordingly, means may be provided for changing the speed of the cam 40. Further, the rate will determine how long the logging equipment will have to spend opposite the area of investigation. In the case of the relatively long life-times of the heavier oils, it will be necessary to stop the logging equipment opposite a promising formation for a time period on the order of a minute or so.

When it is desired to investigate the chemical properties of a fluid flowing through a closed conduit, the decay of the signal representative of the presence of paramagnetic free radicals may be continuously monitored by having the source of radiation either suspended in the conduit or positioned adjacent the outside of the conduit, and then detecting the magnetic resonance signal at two spaced apart points along the conduit. The relative amplitudes of the two signals would then be representative of the free radical decay rate, assuming that the rate of flow of fluid in the conduit were known.

Figure 5:
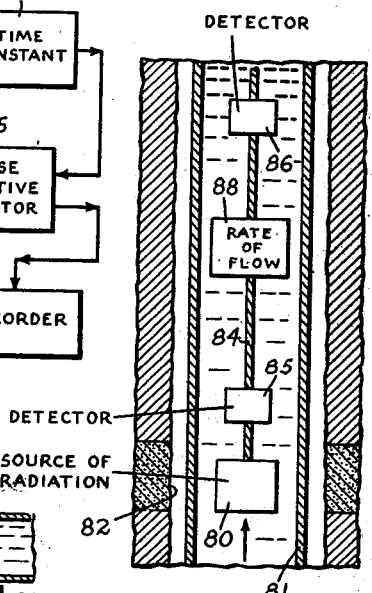
FIG. 5 is a schematic representation of an alternate embodiment of the invention in which a source of radiation and detecting means are fixedly positioned in production tubing in a bore hole.

In FIG. 5 a source of radiation 80 is suspended in a flow pipe 81 disposed in a bore hole 82 by means of a cable 84. Also supported by the cable 84 is a detecting means 85, which may be located either adjacent to or a short distance above the source of radiation 80. A second detecting means 86 is supported by the cable 84 and spaced at a greater distance from the source of radiation 80 and the detecting means 85. The detecting means 85 and 86 may take any suitable form by which they can detect the presence of paramagnetic free radicals in the fluid flowing upwardly in the direction of the arrow through the flow pipe 81, and preferably utilize magnetic resonance phenomena in the manner disclosed in FIG. 4, for example. A rate of flow sensing device 88 is also suspended from the cable 84 and may take any conventional form, whereby the rate of flow of fluid through the flow pipe 81 past the source of radiation 80, and the detecting means 85 and 86 may be determined.

In FIG. 6, the chemical properties of fluid flowing through a closed conduit or horizontal pipe 90 in the direction of the arrow is detected by using a source of radiation 91 which is disposed outside of but adjacent to the conduit 90. A detecting means 92 is also located outside of the conduit 90 but adjacent thereto either at the same location as the source of radiation 91 or at a point downstream thereof where it would be expected that paramagnetic free radicals in the fluid flowing through the conduit 90 produced as a result of irradiation by the source of radiation 91 would be expected to exist. Similarly as in FIG. 5, a second detecting means 94 is positioned still further downstream. The detecting means 92 and 94 also may take any suitable form whereby the presence of paramagnetic free radicals might be detected in the fluid flowing through the closed conduit 90 and preferably employ magnetic resonance phenomena. A rate of flow sensing means 95 of conventional form is adapted to detect the rate of flow of the fluid through the closed conduit 90.

In order to determine the rate of decay of the paramagnetic free radicals present in the fluid flowing through the conduit 90, a rate of decay detector 96 is utilized. The rate of decay detector 96 is coupled to the rate of flow sensing means 95 and the detecting means 92 and 94. It may take any suitable conventional form employing well known computing and indicating techniques and apparatus for determining the rate of decay as a function of the relative amplitudes of the two signals from the detecting means 92 and 94 and the rate of flow of the fluid in the conduit 90 determined by the rate of flow sensing means 95. Similar means for computing the rate of decay of the paramagnetic free radicals flowing through the flow pipe 81, which is responsive to the rate of flow sensing means 88 and the detecting means 85 and 86, in FIG. 5, may be utilized.

In FIG. 7, a source of radiation 101, for example, a suitable source of gamma rays, is suspended in and adapted to be moved through a bore hole 102 past earth formations, of which the chemical properties are to be investigated, by a cable 104. Positioned at or just above the source of radiation 101 is a temperature sensing device 105 for sensing the temperature of the earth formations through which the source 101 is passing, as well, in some cases, as the temperature of any fluid which may be in the bore hole. Also suspended from the cable 104 is a second temperature sensing device 106 which is positioned at a fixed point substantially below the source of radiation 101.

Thus when the source of radiation 101 is moved upwardly through the bore hole in the direction of the arrow, the temperature sensing device 105 supplies indications as to the temperature of the earth formations, and/or the bore hole fluid before the chemical change or the result of the chemical change becomes readily detectable in the substances being irradiated by the source 101. On the other hand, the temperature sensing device 106 senses the temperature of the earth formations and/or bore hole fluid at a time when the result of the chemical change, if any, which took place as a result of the irradiation of the substance under investigation by the source of radiation 101, is detectable.

Since the irradiation of certain substances having particular constituents by a source of radiation such as a source of gamma rays initiates the process of polymerization, which is exothermic, the relative temperatures recorded by the temperature sensing devices 105 and 106 would provide an indication as to the presence of particular constituents of certain substances in the area of investigation.

As an example of the order of magnitude of the temperature effect, if a 1 mev. emitter of gamma rays of $n$ curies is taken as the source 101, the quantity $n$ is determined in the following manner. The energy emitted per second by the source is $3.7\ n \times 10^{16}$ e.v. If it is assumed that the formation absorbs 70% of this radiation within a radius of 15 cm. from the center of the bore hole, 80% of the radiation is directed toward the formation and of this 80% the oil absorbs 5%, the total energy absorbed by the oil in an annulus of inner radius 5 cm., outer radius 15 cm. and thickness 15 cm. is approximately $1.1\ n \times 10^{15}$ e.v./sec. In the short time in which polymerization takes place, the heat produced by the oil is $5\ nt \times 10^{19}$ e.v., where $t$ is the time period during which the source is positioned opposite the particular annulus.

If the logging unit is moved at a speed of one foot per minute, $t=30$ sec., and the heat given off per unit volume is $1.6\ n \times 10^{17}$ e.v./cc. or $6.1\ n \times 10^{-3}$ cal./cc. If the specific heat of the formation is 0.25 cal./gm./° C. and the density is 2 gm./cc., the change in formation temperature in the annulus is $1.2\ n \times 10^{-2}$ ° C. Accordingly, if a source with an intensity of 500 curies were used, the temperature of the annulus would increase 6° C. The source could be, for example, a radioactive isotope such as indium 192 or cobalt 60, but preferably should be a high intensity X-ray source to reduce the problem of surface handling.

The distance that the temperature sensing device 106 should be hung from the source 101 may be determined, as follows. For example, the rise in temperature in the bore hole may be approximated by assuming a constant temperature jacket around a 5 cm. radius cylinder enclosing the bore hole. If the temperature of this jacket is 6° C. above bore hole temperature will increase approximately 2° C. in 80 minutes assuming a diffusivity of $8 \times 10^{-4}$ c.g.s. units. Under these conditions the temperature sensing device 106 should be hung 80 feet below the source.

In FIG. 8 a source of radiation 111 is suspended by means of the cable 112 within production tubing 113 having fluid flowing upwardly through the tubing in the direction of the arrow. A temperature sensing device 114 is positioned just above the source of radiation 111 and is likewise suspended from the cable 112. Spaced from the temperature sensing device 114 by a substantial distance is a second temperature sensing device 115. As in the embodiment of FIG. 7, the source of radiation 111 is of an intensity sufficient to induce polymerization in particular constituents of certain substances which might be flowing through the production tubing 113. The relative temperatures sensed by the temperature sensing devices 114 and 115 provide an indication as to whether or not substances in which exothermic polymerization has occurred as a result of irradiation by the source of radiation 111 are passing through the production tubing.

In the embodiment of FIG. 9, a source of radiation 121 is suspended by a cable 122 at a position in the bore hole 123 opposite a formation 124 which is suspected of containing oil. A temperature sensing device 125 is positioned at or adjacent to the source of radiation 121 to detect a change in temperature as a result of irradiation of the substances under investigation by the source 121. In contrast to the high intensity sources of radiation which are required when there is relative movement between the source of radiation and the substance under investigation, the intensity of the source 121 may be reduced to 5 curies, if it is permitted to stop opposite the formation for 30 minutes, in order to produce the same temperature rise in the bore hole as would be produced by a source of 500 curies moving at a speed of one foot per minute through the bore hole.

In the alternative embodiment of FIG. 10, a source of radiation 131 is suspended from a cable 132 and adapted to be passed upwardly through a bore hole 133 in the direction of the arrow. Suspended below the source of radiation 131 is a gas detecting device 134, which may take any conventional form suitable for detecting the presence of hydrogen gas, for example. This hydrogen gas would be evolved upon irradiation of particular constituents of certain substances resulting in the initiation of polymerization in those substances. Thus as a source of radiation 131 moves upwardly through the bore hole and passes a formation 135 bearing oil, polymerization is initiated in the oil of the irradiated formation and at least some hydrogen gas will be evolved as a free gas. This hydrogen gas may be detected, for example, by a palladium tube detector 134.

As was the case for the detection of the presence of paramagnetic free radicals in fluids flowing through closed conduits or piping, shown in FIG. 6, temperature sensing devices 141 and 142 may be spaced along the outside of a conduit 143 in such a manner as to detect the exothermic polymerization of substances irradiated by a source of radiation 144, also positioned outside of the closed conduit 143 but adjacent thereto. The temperature sensing devices 141 and 142 may employ conventional thermocouples connected to the conduit 143 but spaced apart along the conduit 143 downstream of the source of radiation 144 by a distance sufficient to permit a detectable increase in temperature in response to irradiation.

Thus, there has been provided, in accordance with the principles of the invention, novel methods and apparatuses for investigating the chemical properties of unknown substances which are located in inaccessible locations, such as earth formations within a bore hole, fluids flowing through production tubing in a bore hole, or in otherwise inaccessible closed conduits.

It will be obvious to those skilled in the art that the various disclosed embodiments are meant to be merely exemplary and that they are susceptible of modification and variation within the spirit and scope of the invention. For example, instead of using the two sources of radiation 31 and 32, which are alternately caused to irradiate the substances under investigation and to be shielded therefrom during different portions of a recurrent time cycle, a source of radio-activity, such as disclosed in copending application Serial No. 275,932, filed March 11, 1952, for "Neutron Well Logging," in the name of Clark Goodman, which may be turned on and off, or pulsed at a predetermined frequency, may be used. The pulsing of such a source may be controlled by the synchronous motor 41, for example. Accordingly, the invention is not deemed to be limited except as defined in the appended claims.

I claim:

1. Apparatus for investigating the chemical properties of a substance in an inaccessible location to determine the presence of a particular constituent, comprising the combination of radiation source means adapted to irradiate the substance while in said inaccessible location, shielding means operable in conjunction with said source means for preventing the irradiation of said substance in said inaccessible location by said source means, magnetic resonance means for detecting the presence of free radicals in said substance in said inaccessible location, and modulating means operating in synchronism with said magnetic resonance detecting means for causing said radiation source means to irradiate said substance during at least a portion of a recurrent time cycle and for shielding said source of radiation during other successive intermediate portions of said recurrent time cycle, said successive intermediate portions of said time cycle being a function of the life-time of said free radicals of said particular organic constituent.

2. Apparatus as defined in claim 1, wherein said radiation source means is a source of gamma rays of an intensity sufficient to produce free radicals in a particular constituent of said substance but less than the intensity required to produce detectable free radicals in other unwanted constituents.

3. Apparatus for investigating the chemical properties of the earth formations surrounding a bore hole to determine the presence of a particular organic constituent therein, comprising the combination of an exploratory mechanism adapted to be passed through said bore hole and having a pad adapted to be urged against the side of said bore hole, two sources of radiation mounted in said pad for causing the irradiation of earth formations adjacent said pad, shielding means mounted on said pad for shielding said earth formations from irradiation by said sources of radiation, modulating means for causing relative movement of said sources of radiation and said shielding means to permit said earth formations adjacent said pad to be irradiated by said sources at least during portions of a recurrent time cycle and to be shielded from such irradiation during other successive intermediate portions of said recurrent time cycle, and magnetic resonance detecting means for detecting the presence of free radicals in said irradiated earth formations at least during part of said other successive intermediate portions of said time cycle, said other successive intermediate portions of said time cycle having a duration that is a function of the life-time of the free radicals of said particular organic constituent.

4. Apparatus as defined in claim 3, wherein said modulating means comprises spring biased, cam operated means for moving said sources of radioactivity relative to said shielding means to selectively interpose said shielding means between said sources and said earth formations.

5. Apparatus as defined in claim 4, including means for varying the operation of said modulating means as a function of the ambient conditions of said bore hole and the particular organic constituent to be detected.

References Cited in the file of this patent

UNITED STATES PATENTS

| | | |
|---|---|---|
| 2,220,509 | Brons | Nov. 5, 1940 |
| 2,712,081 | Fearon et al. | June 28, 1955 |
| 2,755,430 | Jackson | July 17, 1956 |
| 2,770,771 | Schuster | Nov. 13, 1956 |
| 2,921,006 | Schmitz et al. | Jan. 12, 1960 |
| 2,976,422 | Hill et al. | Mar. 21, 1961 |

FOREIGN PATENTS

| | | |
|---|---|---|
| 724,441 | Great Britain | Feb. 23, 1955 |

OTHER REFERENCES

Sun, Modern Plastics, volume 32 (September 1954), pages 141–144, 146, 148, 150, 229–233, 236.